United States Patent [19]

Machida

[11] Patent Number: 4,546,446
[45] Date of Patent: Oct. 8, 1985

[54] DIGITAL PROCESSING CIRCUIT HAVING A MULTIPLICATION FUNCTION

[75] Inventor: Toshiaki Machida, Tokyo, Japan

[73] Assignee: Nippon Electric Co., Ltd., Japan

[21] Appl. No.: 352,398

[22] Filed: Feb. 25, 1982

[30] Foreign Application Priority Data

Feb. 25, 1981 [JP] Japan .................................. 56-26499

[51] Int. Cl.[4] .............................................. G06F 7/54
[52] U.S. Cl. .................................... 364/759; 364/757
[58] Field of Search ............... 364/200, 900, 759, 757, 364/760

[56] References Cited

U.S. PATENT DOCUMENTS

| 3,878,985 | 4/1975 | Ghest et al. | 364/759 |
| 4,027,147 | 5/1977 | Majos et al. | 364/759 |
| 4,142,242 | 2/1979 | Duvochel et al. | 364/759 |
| 4,153,938 | 5/1979 | Ghest et al. | 364/757 |
| 4,228,518 | 10/1980 | Chamberlin | 364/759 |
| 4,405,992 | 9/1983 | Blau et al. | 364/759 |

OTHER PUBLICATIONS

Gerberich, F. G., "Multiplier/Divider Hardware Design Accelerates Microprocessor Throughput", Computer Design/Jun. 1979.

Primary Examiner—Jerry Smith
Assistant Examiner—Michael R. Fleming
Attorney, Agent, or Firm—Sughrue, Mion, Zinn, Macpeak, and Seas

[57] ABSTRACT

In a Booth's algorithm multiplication circuit, a multiplicand is set in a multiplication register and a multiplier is set in a multiplier shift-register. Consecutive bits of the multiplier are applied to a Booth's decoder to produce coefficients, and the multiplicand and coefficient are multiplied by each other to produce a partial product. Partial products are produced for every three consecutive bits of the multiplier, and the obtained partial products are added to the sum of previously obtained partial products. After all the partial products are added together, the resultant sum is derived from the adder or from the feed-back path of the output from the adder.

18 Claims, 14 Drawing Figures

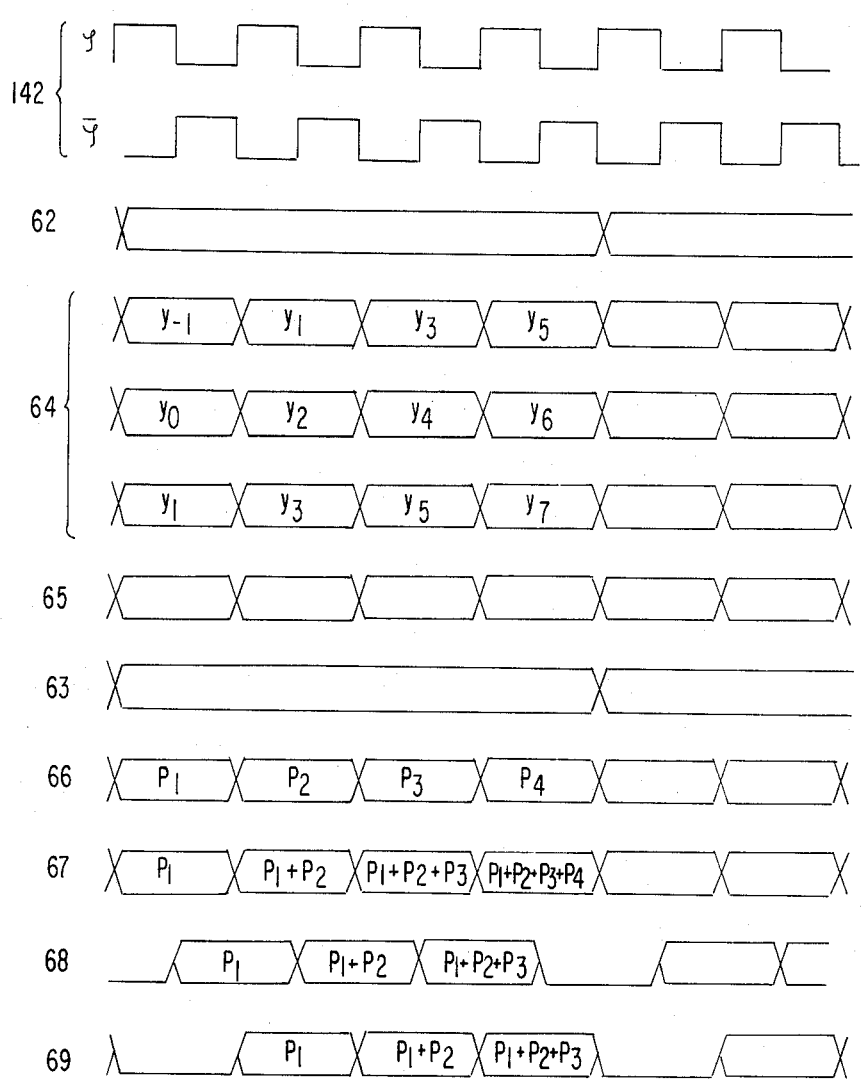

DIGITAL PROCESSING CIRCUIT HAVING A MULTIPLICATION FUNCTION

BACKGROUND OF THE INVENTION

The present invention relates to a digital processing circuit, and more particularly to a digital circuit with a multiplication function making use of Booth's algorithm.

Owing to developments in large scale integrated circuit (LSI) techniques, it has become possible to digitally process signals (information) which have been heretofore processed in an analog manne Recently, LSI circuits have been used to process complex scientific calculations. One of the important functions in such type of digital processing circuits is a multiplication function. Moreover, in such signal processing, the multiplier circuit is often required to operate at high speed. Accordingly, research and development for a high speed multiplication algorithm has been carried out actively. The multiplication operation usually requires a process for producing partial products, a process for accumulating the produced partial products and a sign process. In order to achieve high speed operation, how these processes are executed and how skillfully they are combined is a major problem.

In general, a simple algorithm is employed. More specifically, in the case of multiplying a multiplicand X by a multiplier Y, partial products equal to the number of bits in the multiplier Y are produced by executing multiplications of the multiplicand X by the respective bits in the multiplier Y, and they are added together to obtain the results. However, in this algorithm, N partial products are produced for an N-bit multiplier Y, and N addition operations are required to obtain the result. A correction circuit for sign processing is also necessitated. Therefore, a great many hardware elements have to be included in the LSI device of this algorithm. As a consequence, it is not so valuable for practical purposes.

Among the other known multiplication algorithms, Booth's algorithm is useful. This is an algorithm in which a multiplier and a multiplicand represented in a complement form are multiplied by each other. According to this algorithm, the number of partial products is reduced by one-half with respect to the above-described simple algorithm (N/2), and sign processing is executed simultaneously in the process for producing partial products, this being favorable for high-speed processing. However, even though the number of partial products is reduced, hardware for executing Booth's algorithm becomes very complex. Especially, many circuit elements are required for producing partial products and for adding the produced partial products. Furthermore, the combination of these circuit elements is complex and hence the manufacture of an LSI circuit is difficult using Booth's algorithm.

Still further, in the case where the multiplier circuit of Booth's algorithm is used in a relatively low frequency band as in the case where it is used in speech synthesis, timing control for the circuit is difficult because of its high speed processing. For such multiplication processing of low frequency signals, it is more desirable to reduce the number of circuit elements rather than to realize high speed processing. In other words, a multiplier circuit matched to the operation speed of a low frequency signal processing circuit is required. Especially since a multiplier circuit is used for a digital filter section in a speech synthesizer system, timing control thereof is extremely important. Accordingly, even if a multiplication result is obtained through high-speed processing, delay circuits, latch circuits and the like must be added to the output stage of the multiplier circuit for the purpose of attaining synchronization with the other speech synthesizer circuits, so that more and more hardware circuit elements become necessary. It is desirable to provide a circuit design for performing multiplication according to Booth's algorithm.

SUMMARY OF THE INVENTION

It is one object of the present invention to provide a digital processing circuit having a multiplier function that is suitable for processing signals in a low frequency band such as speech signals.

Still another object of the present invention is to provide a digital circuit for executing a multiplication operation on the basis of Booth's algorithm with a small number of circuit elements.

Yet another object of the present invention is to provide a digital circuit controlled by fewer kinds of timing signals (clock signals).

A still further object of the present invention is to provide a multiplier circuit which executes a decode process, a partial product producing process and a partial product adding process based on Booth's algorithm within the same cycle.

A digital processing circuit according to the present invention comprises first means for storing a multiplicand, second means for storing a multiplier, third means for producing coefficients by decoding the multiplier read out of the second means according to Booth's algorithm, fourth means coupled to the third means and the first means for producing partial products by multiplying the multiplicand by the coefficients, fifth means having first and second input sections for executing addition of first and second inputs received at the first input section and at the second input section, respectively, the first input section being coupled to the fourth means to receive the partial products as the first input, sixth means for receiving an addition result from the fifth means and feeding back the result to the second input section of the fifth means as the second input of the fifth means and seventh means coupled to said fifth or sixth means for outputting a multiplication result.

According to the present invention, the fourth means only multiplies the multiplicand input from the first means by the coefficients produced according to Booth's algorithm by the third means to produce partial products, and merely transfers the multiplication results to the fifth means. The fifth means and the sixth means are coupled in a ring shape so as to form a loop. Accordingly, by circulating data within this loop, accumulation of the partial products can be achieved and eventually the multiplication result can be obtained. Thus, a multiplication operation based on Booth's algorithm can be executed by means of simple hardware elements (the first to sixth means) without requiring a large number of partial product producing circuits and adder circuits. Moreover, with regard to timing control the output timing of the fourth means for partial products and the input timing of the fifth means for the partial products are synchronized, and erroneous operation can be prevented without any strict control of the input and output timing such as is required for the prior art multiplier circuit wherein a number of partial product producing circuits and adder circuits are used. Accordingly, timing control of the present invention is extremely easy. Furthermore, since the present invention obtains a product (a multiplication result) by carry out additions making use of a loop, matching with a relatively low frequency signal processing circuit such as a speech processing system can be easily attained, and therefore the proposed circuit is most suitable for a multiplier circuit used in a digital filter or the like.

Also, since a single partial product producing circuit (the fourth means) is sufficient, a single coefficient producing circuit (the third means) is also sufficient. Accordingly, a further reduced number of hardware elements suffice for multiplication as compared to the circuit in the prior art. In addition, by arranging the input and output of the third means in a parallel input and output structure, it becomes possible to process the production of coefficients, the production of partial products and the addition of partial products in the same cycle. This modification simplifies not only the timing control but also the circuit design. Especially, with regard to the timing control, only a single clock frequency is necessary.

BRIEF DESCRIPTION OF THE DRAWINGS

The above-mentioned and other objects, features and advantages of the present invention will become more apparent by reference to the following description of preferred embodiments of the invention taken in conjunction with the accompanying drawings, wherein:

FIG. 14 is an operation timing chart for the multiplier circuit shown in FIG. 13.

DESCRIPTION OF THE PRIOR ART

Figure 1:
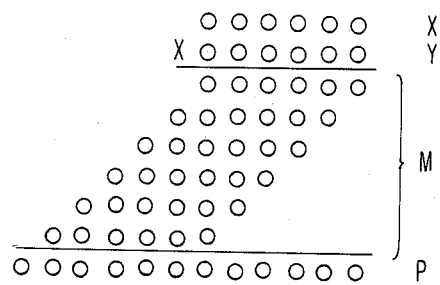
FIG. 1 is a schematic view showing a multiplication process based on a heretofore well known multiplication algorithm.

The heretofore well known multiplication algorithm is such that partial products N of a multiplicand X by respective bits of a multiplier Y are produced and then they are all added together to obtain a resultant product P as shown in FIG. 1. It is clear that, for a multiplier Y of N bits, N partial products are necessarily produced. In order to obtain a resultant product P, N additions are necessitated, resulting in a long operation time duration. Thus, this algorithm is not suitable for a multiplier circuit which is required to have a rapid operating speed. Therefore, various other multiplication algorithms have been investigated. Among them, for instance, the 2-bit Booth's algorithm has proven to be especially suitable for high-speed operation and for implementation in an LSI device. The 2-bit Booth's algorithm means an algorithm in which two numbers represented in two's complement form are multiplied by each other. This algorithm will be explained by assuming that a multiplicand is X and a multiplier is Y. The multiplicand X may be represented in two's complement form as follows:

$$X = -x_n \cdot 2^{n-1} + \sum_{i=1}^{n-1} x_i \cdot 2^{i-1} \tag{1}$$

where $x_n$ is '0' when the multiplicand X is a positive number while it is '1' when the multiplicand X is a negative number. In the case of a negative number, $x_i$ represents the respective bits obtained by inverting the respective bits in the binary code representing the original number and adding one to the least significant bit. The multiplier Y may be represented in a similar manner, as follows:

$$Y = -y_n \cdot 2^{n-1} + \sum_{i=1}^{n-1} y_i \cdot 2^{i-1} \tag{2}$$

Here, paying attention to the multiplier Y, Equation-(2) can be modified as follows:

$$Y = -y_n \cdot 2^{n-1} + y_{n-1} \cdot 2^{n-2} + y_{n-2} \cdot 2^{n-3} + \ldots + \tag{3}$$

$$y_4 \cdot 2^3 + y_3 \cdot 2^2 + y_2 \cdot 2 + y_1 \cdot 2^0$$

$$= -y_n \cdot 2^{n-1} + y_{n-1} \cdot 2^{n-2} + (2y_{n-2} - y_{n-2}) \cdot 2^{n-3} + \ldots$$

$$= -y_n \cdot 2^{n-1} + y_{n-1} \cdot 2^{n-2} + 2y_{n-2} \cdot 2^{n-3} - y_{n-2} \cdot 2^{n-3} + \ldots$$

$$= (-2y_n + y_{n-1} + y_{n-2})2^{n-2} + (-2y_{n-2} + y_{n-3} + y_{n-4}) \cdot$$

$$2^{n-2} + \ldots + (-2y_n + y_3 + y_2) \cdot 2^2 + (2y_2 + y_1 + y_0) \cdot 2^0$$

$$= \sum_{i=0}^{\frac{n}{2}-1} (-2y_{2i+2} + y_{2i+1} + y_{2i}) \cdot 2^{2i}$$

Here, for simplicity, it is assumed that $y_0 = 0$ and n is an even number. From Equation (3), the product of X and Y is represented as follows:

$$P = XY = \sum_{i=0}^{\frac{n}{2}-1} (-2y_{2i+2} + y_{2i+1} + y_{2i}) X \cdot 2^{2i} \tag{4}$$

where each term on the right side $(-2y_{2i+2} + y_{2i+1} + y_{2i}) X \cdot 2^{2i}$ forms a partial product. As will be obvious from the above equation, n/2 partial products are obtained for the n-bit multiplier. It is noted that $2^{2i}$ represents the weight of each bit. Since the coefficient $(-2y_{2i+2}+y_{2i+1}+y_{2i})$ for X takes any one value among 0, ±1 and ±2 depending upon the values of three consecutive bits, as indicated in the truth table of Table 1, each partial product takes any one value among 0, ±X and ±2X. In this instance, since 2X means a double of the multiplicand, it can be produced by merely shifting X leftwards by one bit. On the other hand, a negative number can be produced by producing a one's complement of X, that is $\overline{X}$ and adding one to its least significant bit. As described above, according to Booth's algorithm, a partial product can be produced in the form containing a sign bit without specially dealing with a sign bit in two's complement form, and therefore, there is provided a hardware advantage in that a correction circuit for sign operation is not necessitated.

TABLE 1

| $y_{i+2}$ | $y_{i+1}$ | $y_i$ | Operation |
|---|---|---|---|
| 0 | 0 | 0 | 0 |
| 0 | 0 | 1 | +X |
| 0 | 1 | 0 | +X |
| 0 | 1 | 1 | +2X |
| 1 | 0 | 0 | −2X |
| 1 | 0 | 1 | −X |
| 1 | 1 | 0 | −X |
| 1 | 1 | 1 | 0 |

Figure 2:
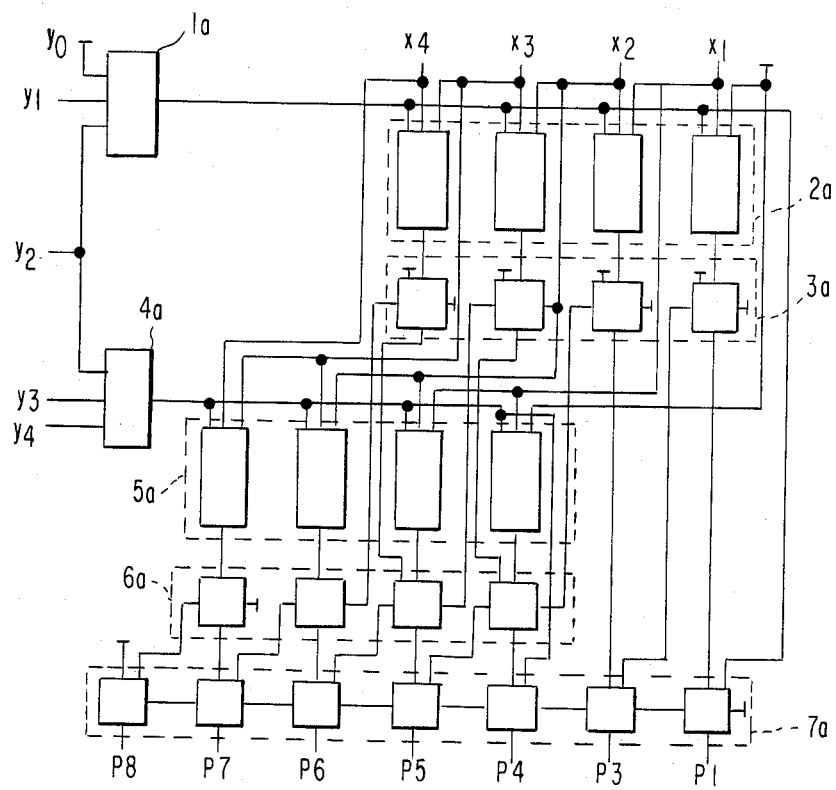
FIG. 2 is a block diagram of a heretofore known multiplier circuit which executes a multiplication based on Booth's algorithm.

One construction of a heretofore known parallel multiplier circuit for executing Booth's algorithm is illustrated in FIG. 2. This figure shows the case where two 4-bit numbers are multiplied, and $x_1$, $x_2$, $x_3$ and $x_4$ represent respective bits of a multiplicand, while $y_1$, $y_2$, $y_3$ and $y_4$ represent respective bits of a multiplier. Reference numeral 1a designates a Booth's decoder by which, according to the values of three consecutive bits $y_0(=0)$, $y_1$ and $y_2$, any one of 0, ±1 and ±2 is selected as the coefficient. Depending upon the output of this decoder 1a, a partial product is produced by a partial product producing circuit 2a. Addition of the output of this circuit 2a to a partial sum of the previously obtained partial products (in this instance, to an initial value of 0) is executed by a full adder 3a formed of a plurality of one-bit full adders. A similar operation is executed for three consecutive bits $y_2$, $y_3$ and $y_4$ in the other Booth's decoder 4a, and the corresponding partial product is produced by a partial product producing circuit 5a. The less significant two bits of this partial product are added to the more significant two bits of the output from the preceding full adder 3a by another full adder 6a. As a matter of course, a carry is also output, if it exists. Eventually, additions for the respective corresponding bits are executed by a full adder 7a, and thereby a product (P1 P2 P3 ... P7) is obtained. An additional bit P8 is a sign bit for the product.

It is to be noted that, although a small number of full adders would suffice in the case where the number of bits is small as in the above-described example, if the number of bits is increased, the number of full adders is increased depending on the number of bits in a multiplier and the number of bits in a multiplicand. For instance, in a multiplier circuit for an N-bit multiplier and an M-bit multiplicand (for simplicity, N is assumed to be an even number), N/2 full adders are necessitated. However, in the case of processing signals at a relatively low frequency that is as low as, for example, a speech signal there is no need to execute high-speed multiplication, but instead it is more desirable to reduce the number of hardware elements. Moreover, in the case where full adders and partial product producing circuits are cascaded in a plurality of stages as shown in FIG. 2, the input and output timings of the respective stages must be strictly controlled lest erroneous operations occur. This timing control, however, becomes more difficult as the number of the cascaded stages is increased. More particularly, a plurality of timing signals having different phases, clock signals having different frequencies and the like are required. Furthermore, the number of Booth's decoders 1a and 4a is also increased, and so the hardware elements become more and more complex.

DETAILED DESCRIPTION OF THE INVENTION

Figure 3:
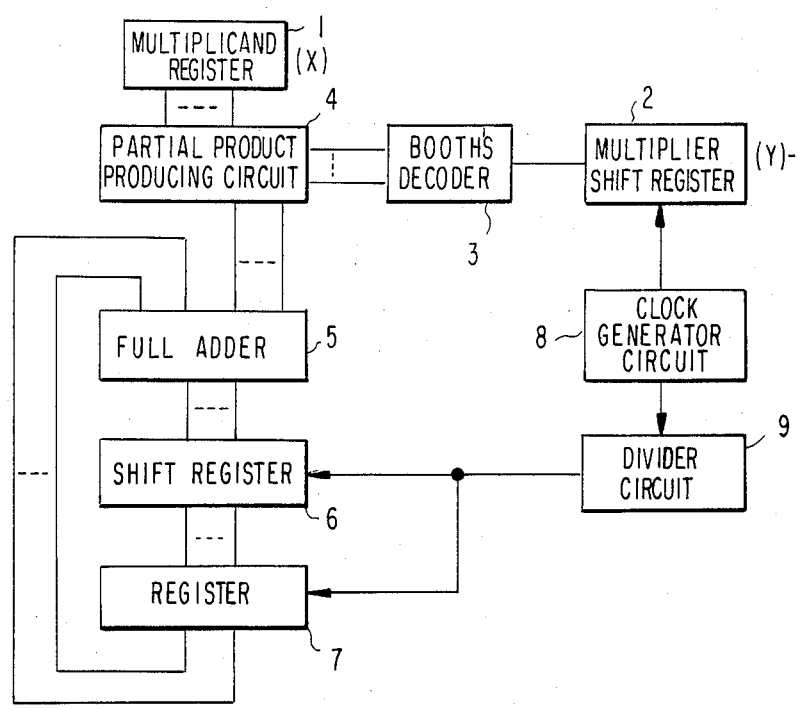
FIG. 3 is a block diagram of a multiplier circuit making use of Booth's algorithm according to one preferred embodiment of the present invention.

A block diagram of a digital processing circuit having a multiplier function according to one preferred embodiment of the present invention which eliminates the abovementioned shortcomings in hardware and timing control, is illustrated in FIG. 3. In this circuit, only one full adder 5 and one partial product producing circuit 4 are provided which operate according to Booth's algorithm. The full adder 5 is used to obtain a product by repeating an operation of adding a partial product produced by the partial product producing circuit 4 to a total sum of the previously obtained partial products. A multiplicand X is set in register 1 and a multiplier Y is set in shift register 2. The multiplier Y, which is set in the shift register 2 with the last significant digit located et the left end bit position, is shifted bit by bit as synchronized with a clock applied from a clock generator circuit 8 (in particular, this could be a clock generator used within a speech Irocessing system), and at first the least significant three bits are provided as an input to a Booth's decoder 3. The output of the decoder 3 obtained by decoding the input three bits according to Table 1 above is then provided as an input to the partial product producing circuit 4 together with the multiplicand. A partial product produced by the partial product producing circuit 4 is provided as an input to the full adder 5 having another input section coupled to the output of a register 7 which holds a sum (partial sum) of the previously obtained partial products. A new partial sum is produced in this full adder 5 and is provided as an input to shift register 6. This shift register 6 is insetted for the purpose of shifting the output of the full adder 5 and transferring them to the register 7 which holds the partial sum for transfer at a predetermined timing in response to a clock applied from a clock frequency-divider circuit 9. A clock for driving the register 7 is applied from the same clock frequency-divider circuit 9 and hence it is synchronized with the clock applied to the shift register 6.

The Booth's decoder 3 executes a decode processing for every three consecutive bits of the multiplier, and transfers the decoded output to the partial product producing circuit 4. This circuit 4 carries out multiplication of the multiplicand by a decoded output to produce a partial product each time a decoded output is transferred. These operation timings can be easily controlled so as to be synchronized with anothe circuit by means of the same clock generator. Further, all the partial products necessitated in the multiplication are produced by the single partial product producing circuit 4. Further, the full adder 5, shift register 6 and register 7 are coupled in a loop, and hence, addition (production of a partial sum) is effected once within each partial product producing cycle. Accordingly, production of a partial sum is effected simultaneously with production of a partial product. After these operations have been repeated, a resultant product can be obtained at the moment when the last addition of the last partial product to the psrtial sum has been completed.

As described above, according to this embodiment, the number of partial product producing circuits and addition processing circuits can each be reduced to only one for executing the Booth's algorithm. Moreover, since it requires only the control of the timing of production of a partial product and the timing of addition processing, timing control is extremely simple. Furthermore, since the timing control can be achieved with only two kinds of clocks, the multiplier circuit according to the above-described embodiment is especially advantageous for manufacture in an LSI circuit. In addition, since a shift register 6 for temporarily holding a newly produced partial product and shifting it in parallel is provided between full adder 5 and the register 7 and is controlled by the same timing signal (clock) as for the register 7, data can be maintained within the partial sum transfer loop without being mixed. Still further, since the shift timing for the multiplier 2 and the input/output timing for the register 7 are controlled by clocks generated by the same clock generator 8, there exists the advantage that matching between the operation of this multiplier circuit and that of another information processing circuit (for example, a speech synthesizer circuit) can be easily realized.

Figure 4:
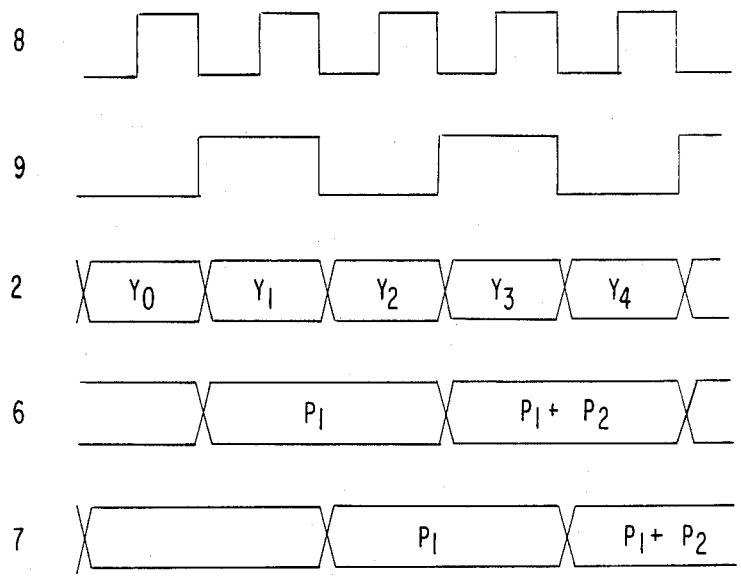
FIG. 4 is an operation timing chart for the multiplier circuit in FIG. 3.

Now, let us consider the rate of shifting a multiplier (Y) bit by bit to produce one partial product and the rate of circulating a partial sum of partial products in the loop of 5→6→7→5 with reference to FIG. 3, in connection with the case of the 2-bit Booth's algorithm. As shown in FIG. 4, the rate of shifting the multiplier Y must be twice as large as the transfer rate of the addition and circulation process. This is because the Booth's decoder 3 carries out a decode processing for each unit consisting of three bits and one of the these three bits (that is, the most significant bit) is used again in the next subsequent decode processin as the least significant bit. That is, the bit is stored in the Booth's decoder 3 during two consecutive decode processings. Therefore, two new bits are to be input to the Booth's decoder 3 for each decode processing. These bits are set in the Booth's decoder 3 within two clock cycles. Accordingly, these two clock cycles correspond to one addition and transfer cycle. To that end, the clock frequency-divider 9 divides the frequency of the clock generated by the clock generator circuit 8 by ½. In other words, the frequency-divider circuit 9 is necessary for the purpose of synchronizing the timing for production of partial products with the timing for addition. If it is assumed that a Booth's algorithm of more than 2 bits is employed, the ratio of frequency-division must be increased further. On the other hand, on the basis that the number of hardware elements in the multiplier circuit should be minimized, provision of two clock systems is not desirable in view of circuit area considerations; hence, a design to further reduce the number of hardware elements will now be explained.

In the following, a multiplier circuit according to another preferred embodiment of the present invention in which the circuit construction is further improved from the aforementioned view point will be described. It is to be noted that, in the Booth's decoder 3 of FIG. 3, the data held therein must be shifted by 2 bits for each decode processing in the case of a 2-bit Booth's algorithm, while in the case of a higher order Booth's algorithm, such as an n-bit Booth's algorithm, the data must be shifted by the corresponding number of bits, that is, by n bits. Accordingly, in this improved embodiment, an arrangement is made such that the multiplier shift register may be used in a parallel form depending upon the order of the Booth's algorithm.

Figure 5:
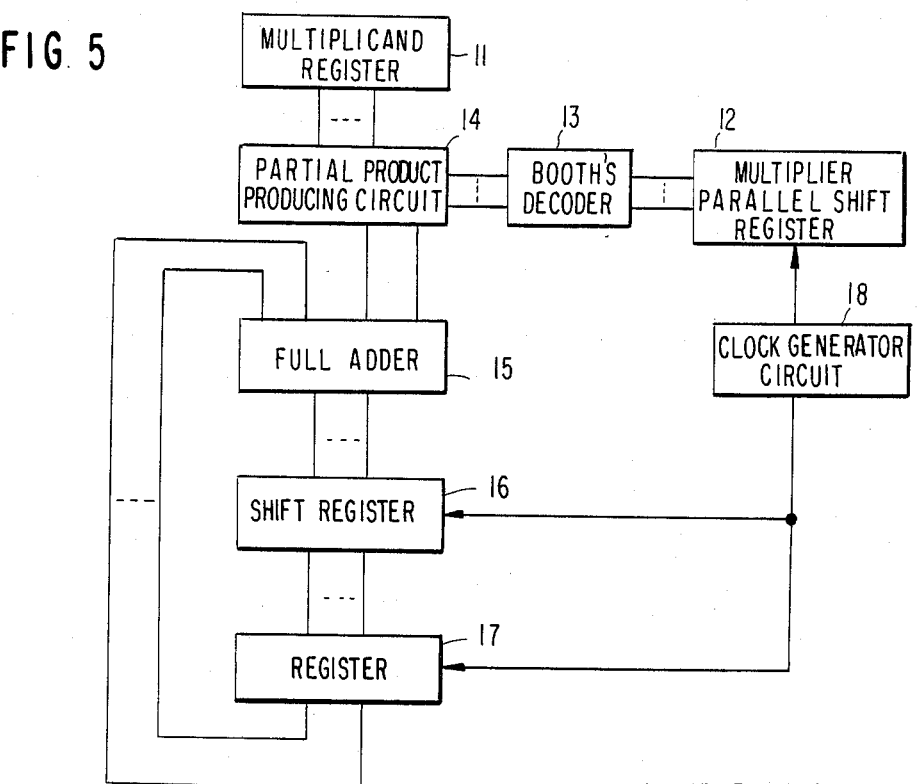
FIG. 5 is a block diagram showing a multiplier circuit making use of Booth's algorithm according to another preferred embodiment of the present invention.
Figure 6:
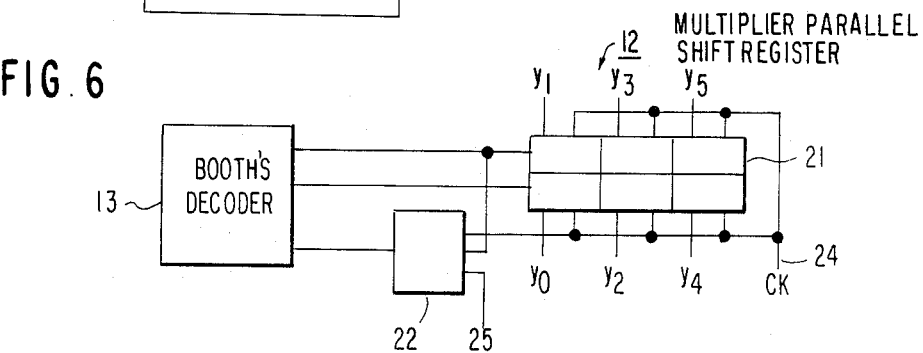
FIG. 6 is a novel circuit diagram of a Booth's decoder and a shift register to be used in the multiplier circuit shown in FIG. 5.
Figure 7:
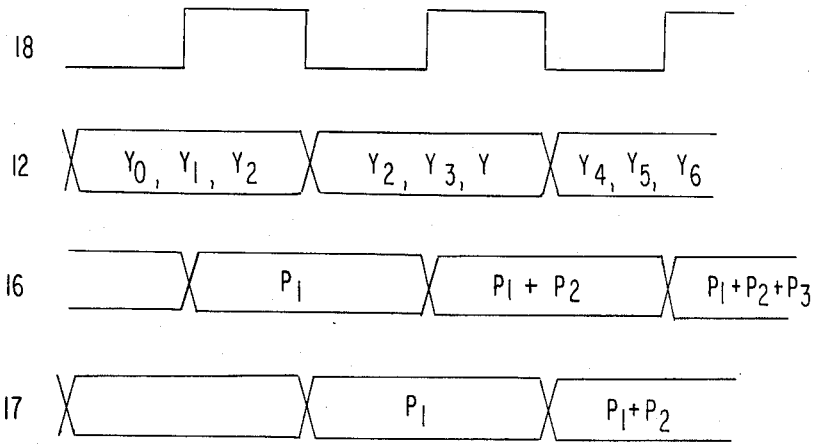
FIG. 7 is a timing chart showing operation of a multiplication process making use of the multiplier circuit in FIG. 5.

Now the improved embodiment will be explained with reference to FIG. 5 in which the second order Booth's algorithm is employed. Here, blocks designated by reference numerals 11 and 13 to 17 in this figure correspond to the blocks designated by reference numerals 1 and 3 to 7 in FIG. 3, and the corresponding blocks have the same function. Assuming now that a multiplier is $y_5, y_4, y_3, y_2, y_1, y_0$, then according to the second order Booth's algorithm, the multiplier must be applied to a Booth's decoder 13 sequentially in a plurality of sets each consisting of $y_1, y_0, y_{-1}$ (it is assumed that $y_{-1}=0$ is fulfilled), $y_3, y_2, y_1$ and $y_5, y_4, y_3$, respectively. A more detailed circuit diagram of this multiplier shift register (hereinafter called "multiplier parallel shift register") 12 is illustrated in FIG. 6. In this multiplier parallel shift register 12, a multiplier is shifted by 2 bits in response to each clock 24 applied from a clock generator 18. To that end, the bits in the multiplier are divided into two groups (in the illustrated example, into odd number and even number bit groups) and are set in the respective stages of a parallel 2-stage shift register 21, respectively. In addition, another shift register 22 is provided for holding and reusing a bit in the just preceding odd number group. As a result, an output of three bits can be applied simultaneously to the Booth's decoder 13 in response to one clock. Reference numeral 25 designates a reset signal for the shift register 22. Consequently, in response to application of one clock to the multiplier parallel shift register 12, the necessary three bits can be applied simultaneously to the Booth's decoder 13. The output of the Booth's decoder 13 is provided as an input to a partial product producing circuit 14 coupled to an output of a multiplicand register 11 to produce a partial product. The produced partial product is subjected to operation together with a partial sum of the previously produced partial products (set in a register 17) in a one-stage parallel full adder 15 so as to produce a new partial sum. The new partial sum is input to a register 17 for holding an up-to-date partial sum via a shift register 16 serving as a timing buffer gate. Then, owing to the fact that the shift register in which a multiplier is set is constructed as shown in FIGS. 5 and 6, the multiplier circuit operates with the timing shown in FIG. 7.

As will be obvious from these figures, according to this improved embodiment it is possible to equalize the rate of shifting data in the multiplier parallel shift register 12 to the transfer rate in the process for renewing a partial sum by adding a newly produced partial product to the previous partial sum (14→15→16→17). Accordingly, it becomes possible to drive the entire multiplier circuit by making use of only a single kind of clock generated by a clock generator circuit 18, and so the hardware used in the frequency-divider circuit 9 in FIG. 3 can be spared. In other words, since the time required for addition and transfer (14→15→16→17) and the time required for setting three bits in the Booth's decoder 3 can be equalized to each other, it becomes possible to perfectly achieve timing control by making use of only one clock generator circuit 18. As described above, the number of hardware elements can be reduced by merely modifying the construction of the shift register in which a multiplier is set, and therefore, the above-described modified embodiment is significantly advantageous from a circuit construction standpoint. In this modified embodiment also, as a matter of course, the effects and advantages described previously in connection with the first preferred embodiment shown in FIG. 3 are still retained.

It is to be noted that while a construction of a multiplier parallel shift register in the case of the second order Booth's algorithm has been illustrated in FIG. 6, in the case of a higher order Booth's algorithm than the second order, obviously it will suffice to modify the register into a parallel form depending upon the order number. In addition, if provision is made such that the timing for transferring the partial sum input fromdhe register 17 to the full adder 15 can be controlled by a control signal, then the shift register 16 may be omitted. Furthermore, modification may be made such that read and/or write operations for the shift register 16 and the register 17 can be controlled by two-phase clock signals $\phi_1$ and $\phi_2$ which are generated by shifting the phase of the clock output from the clock generator 18.

While the present invention is effective when it is embodied in a multiplier circuit for carrying out any digital signal processing, it will provide an especially remarkable advantage if it is applied to a digital filter for dealing with a relatively low frequency signal in a speech synthesizer system.

Speech synthesis is a technique for simulating voicing organs of a human being with hardware, and among the speech synthesizer systems, a linear predictive coding (LPC) system, a partial autocorrelation coefficients (PARCOR) system, a formant system, a second segment assembler system, etc. have been known.

Figure 8:
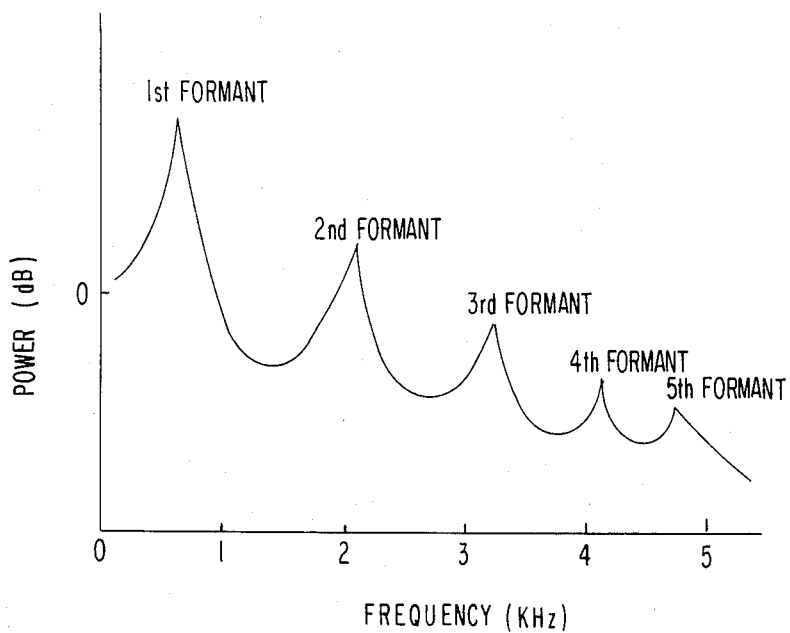
FIG. 8 is a formant frequency characteristic diagram shown a relationship between frequency and energy of a voice.
Figure 9:
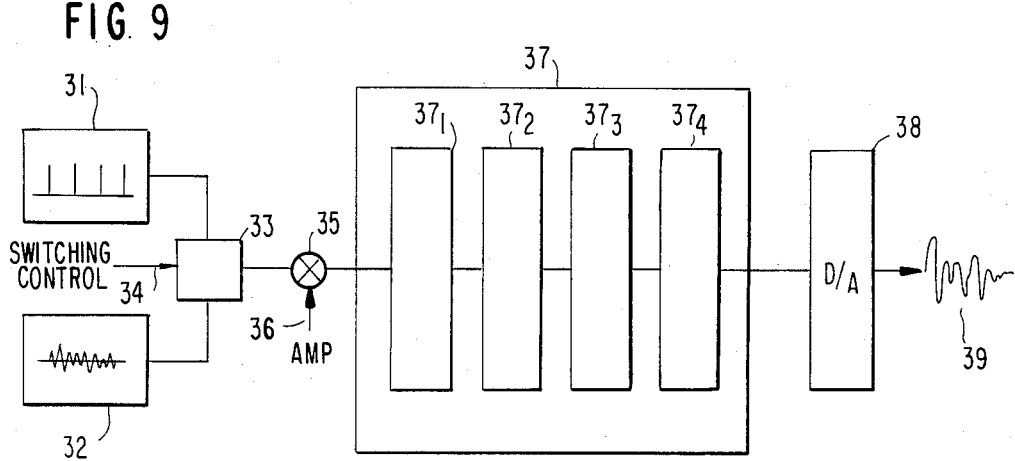
FIG. 9 is a block diagram of a speech synthesizer system employing a formant system.
Figure 10:
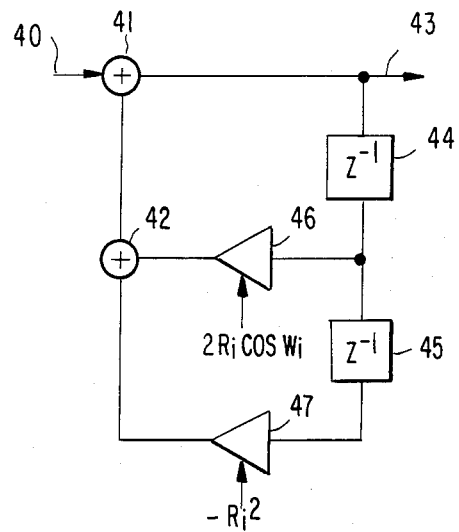
FIG. 10 is a circuit diagram of one stage of a digital filter to be used in the speech synthesizer system in FIG. 9.

Here, by way of example, speech analysis according to the formant system will be considered. If the frequency spectrum of speech is observed, a frequency characteristic as shown in FIG. 8 will be represented. A number of resonance curves overlap with each other, and the observed resonant points are called in sequence from the lowest frequency resonant point, "first formant", "second formant", and so on. Among these formants, the first to fifth formants are shown in FIG. 8. In speech synthesis according to the formant system, after a signal issued from a sound source has been multiplied by amplitude information representing loudness of the speech, the multiplied signal is processed by a resonance characteristic possessed by a human vocal tract, and synthesized speech is thereby generated. With regard to a model of the sound source, as shown in FIG. 9 a periodic impulse signal is employed for a voiced sound, while a pseudo-random signal is employed for an unvoiced sound, and digital filters are used to give a desired resonance characteristic. In FIG. 9, reference numeral 32 designates a random signal (white noise signal) generator circuit. In response to a switching control signal 34, one of these signals is selected by a sound source switching circuit 33, and is multiplied by amplitude data 36 in a multiplier circuit 35. The output of the multiplier circuit 35 is given a resonance characteristic through a digital filter 37. This multiplier circuit 35 is used in common in each state ($37_1 \sim 37_4$) of the filter 37. Then, the output of the filter 37 is converted into an analog signal by a D/A converter 38. This analog signal is provided as a synthesized speech output 39. The resonance characteristic of a formant is obtained by applying the data of the frequency and the bandwidth of the format to the digital filter 37. Each state of the digital filter 37 used in this speech synthesizer may be a second order cyclic type digital filter as shown in FIG. 10. A signal obtained by multiplying the signal issued from the sound source by the data representing loudness of the speech is applied as an input to the first filter stage, and a signal from the filter in the just preceding stage is applied as an input to a subsequent digital filter stage. Coefficients $2R_i \cos W_i$ single term and $-R_i^2$ derived from formant frequency information ($R_i$) and formant bandwidth information ($W_i$) are multiplied with the filter stage input in multiplier circuits 46 and 47 after the filter stage input passes through delay units 44 and 45, respectively. Then, the outputs of multiplier circuits 46 and 47 are superposed on each other by being added together in full adders 42 and 41 to form respective formants. As will be seen from FIG. 10, a multiplicand in the multiplier circuit is a signal obtained by multiplying the signal issued from the sound source by the amplitude information or an output signal generated from a digital filter in the preceding stage, and a multiplier is both the formant frequency information and the formant bandwidth information. Here it is to be noted that, since the frequency of a speech signal is low, the circuit used for speech synthesis is designed so as to operate at a relatively low rate. Accordingly, the multiplier circuit must be constructed so as to match with such circuit design.

In the following, one preferred embodiment of the digital processing circuit having multiplier function to be used in a speech synthesizer system will be explained with reference to FIG. 11.

Figure 11:
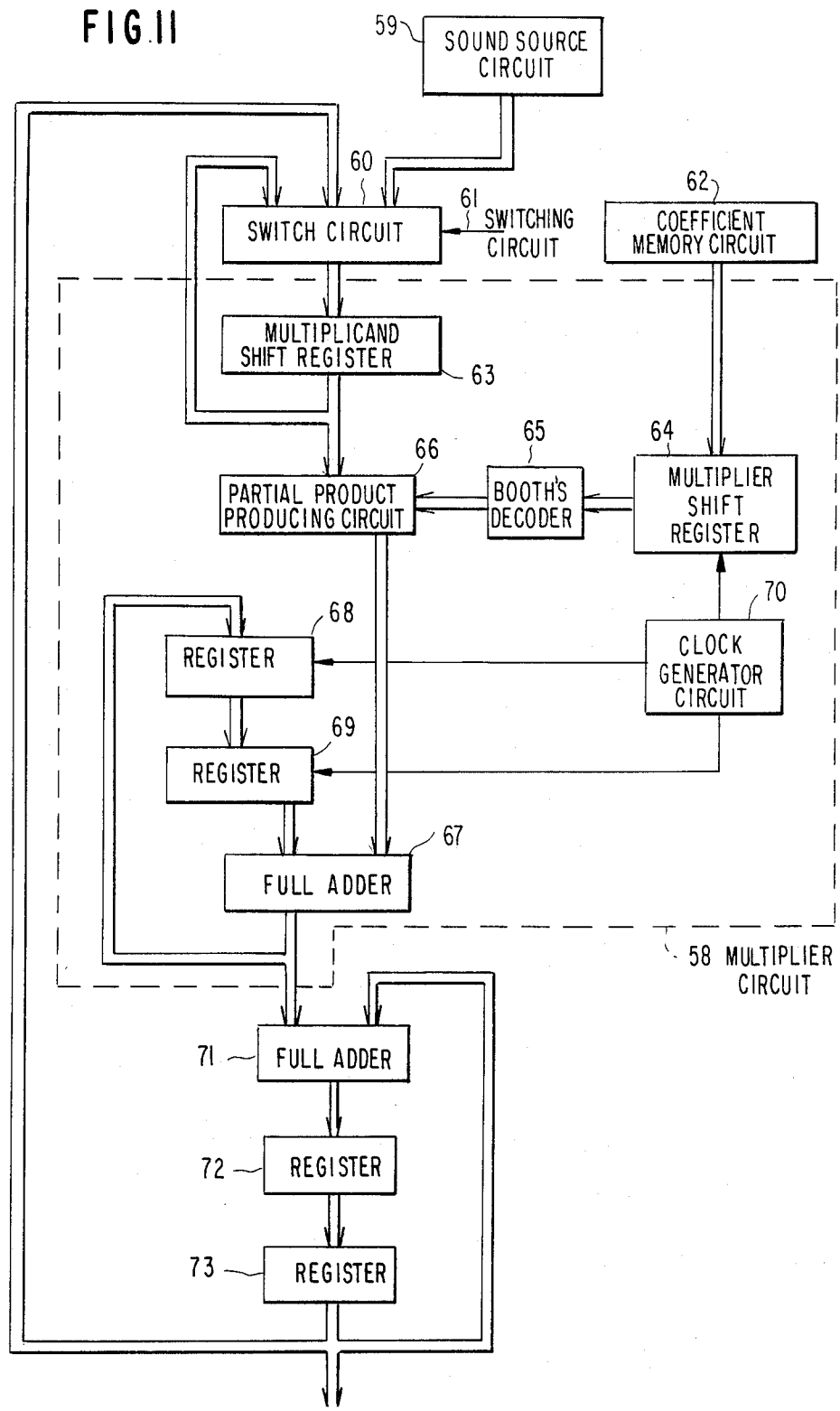
FIG. 11 is a block diagram showing the construction of a part of the speech synthesizer system in FIG. 9, which includes multiplier section of the present invention.

FIG. 11 shows one example of a circuit for realizing the speech synthesizer system in FIG. 9. In this circuit, the portion encircled by a dash line frame 58 is a multiplier circuit according to the present invention. Here, it is assumed that the data length of a sound source includes 12 bits, amplitude information and coefficients consist of 8 bits and formants to be synthesized are the first to fourth formants. A sound source circuit 59 includes the periodic impulse train generator circuit 31, the pseudo-random signal generator circuit 32, the sound source switching circuit 33 and means for generating the sound source switching control signal 34 shown in FIG. 9. An output of the sound source circuit 59 is provided as an input through a switching circuit 60 to a multiplicand shift register 63 which forms a part of the multiplier circuit 58. An output of the multiplicand shift register 63 is provided as an input to a partial product producting circuit 66, and is again set in the multiplicand shift register 63 through the switching circuit 60. Through this operation, the function of the delay circuit 45 in FIG. 10 can be achieved. More specifically, the output of the multiplicand shift register 63 at the present time point corresponds to an output of a delay circuit 44 and can be derived from the multiplicand shift register 63 again to thereby achieve a delay of one bit. On the other hand, amplitude information of each digital filter stage ($37_1 \sim 37_4$) as well as the coefficients ($2R \cos W$ and $-R^2$) of the digital filter in FIG. 10 are stored in a coefficient memory circuit 62, and they are read out to a multiplier shift register 64. The amplitude information or coefficients provided to the multiplier shift register 64 are shifted by a shift clock issued from a clock generator 70, and are then provided two parallel bits at a time to a Booth's decoder 65. A decoded output from the Booth's decoder 65 is provided to the partial product producing circuit 66, in which a partial product of the output of the multiplicand shift register 63 and the decode output is produced. The produced partial produce is provided as an input to a full adder 67, in which the partial product is added to the partial sum (0 in the initial condition) of the previously obtained partial products which is given as an output of a register 69. The result of the addition is set in a register 68. The timing for these operations is controlled by a clock issued from the clock generator 70. Furthermore, in response to a clock issued from the clock generator 70, an output of the register 68 is stored in the register 69. The output of the register 69 is added to the latest partial product in the full adder 67. After the multiplication has been completed, addition is carried out in a full adder 71 in the next stage. Assuming now that the output of the delay circuit 44 in FIG. 10 is A and the output of the delay circuit 45 is B, the multiplication result B ($-R^2$) effected in the multiplier circuit 58 is transferred via the full adder 71 and a register 72 to a register 73, where it is temporarily held for timing control. Thereafter, it is added with the next output $A \cdot 2R \cos W$ of the multiplier circuit 58 in the full adder 71, and it is likewise held in the register 72 and then transferred to the register 73. In this way, an output of one stage of digital filter shown in FIG. 10 is set in the register 73. In the speech synthesis of the formant system, digital filters as shown in FIG. 10 are connected in series in a number equal to as many as the number of formants to be simulated and an output of each digital filter serves as an input to a digital filter in the next stage, so that the output of the register 73 is returned to the multiplicand shift register 63 via the switching circuit 60. This switching circuit 60 selects one among the output of the sound source circuit 59, the output of the multiplicand shift register 63 and the output of the register 73 in response to a switching control signal 61. The speech synthesis is executed in the above-described manner. In this operation, the multiplier circuit 58 carries out the multiplication of the sound source signal by the amplitude information and the multiplication of the data obtained by delaying the input to the digital filter by the coefficients of the digital filter.

Figure 12:
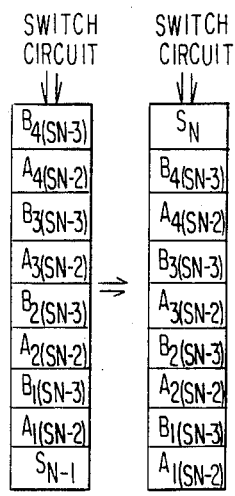
FIG. 12 is a state diagram of speech information to be set in the multiplication shift register shown in FIG. 11.

For convenience of the explanation of the construction of the multiplicand shift register 63, the outputs of the delay circuits 44 and 45 in the digital filter shown in FIG. 10 are denoted by $A_i$ and $B_i$, respectively, and the outputs $A_i$ and $B_i$ of the digital filters for the first to fourth formants are represented by $A_1$, $B_1$; $A_2$, $B_2$; $A_3$, $B_3$ and $A_4$, $B_4$. Also, a sound source signal is represented by S and amplitude information is represented by AMP. Then, as shown in FIG. 9, the input to the digital filter corresponding to the first formant is $S \times AMP$. The output $A_1$ is derived by adding the outputs of the delay circuits 44 and 45, respectively, to the input $S \times AMP$ and delaying the sum by one clock cycle. The output $B_1$ is derived by further delaying the output $A_1$ by one clock cycle. The coefficients of the digital filters corresponding to the respective formants are represented generally by $2R_i \cos W_i$ and $-R_i^2$, so that the respective coefficients will be $2R_1 \cos W_1$, $-R_1^2$; $2R_2 \cos W_2$, $-R_2^2$; ...; $2R_4 \cos W_n$, $-R_4^2$. Hence, the sum of $A_1 \times 2R_1 \cos W_1$, $B_1 \times (-R_1^2)$ and $S \times AMP$ becomes an input to the next digital filter corresponding to the second formant, and the input $A_2$ is derived by delaying this input by one clock cycle. Through the same process, all the inputs up to $A_4$, $B_4$ can be derived. In order to carry out such operations, the multiplicand shift register 63 is constructed of a 9-stage shift register, in which data are disposed as shown in FIG. 12(a). In response to a shift clock, these data are shifted by one bit. After the data S is output from the shift register 63, new data $S_N$ is set in the same shift register via the switching circuit 60 as shown in FIG. 12(b). Subsequently, each time the data are sequentially shifted, new data $A_1$, $B_1$; $A_2$, $B_2$; ...; $A_4$, $B_4$ are successively set in the multiplicand shift register 63 via the switching circuit 60.

Since the respective bit lengths of the amplitude information, $2R_i \cos W_i$ and $-R_i^2$ are 8 bits, the data in the multiplier shift register 64 are 8-bit data Y, which are represented in two's complement form by $y_7\, y_6\, y_5\, y_4\, y_3\, y_2\, y_1\, y_0$. In the second order Booth's algorithm, it is desirable to shift the multiplier in parallel each time by two bits because the multiplier is processed as divided into 3-bit groups $y_7\, y_6\, y_5$, $y_5\, y_4\, y_3$, $y_3\, y_2\, y_1$ and $y_1\, y_0\, y_{-1}$ ($y_{-1}=0$). A flow of data in the partial product producing circuit 66 and the subsequent circuits (full adder 67 → register 68 → register 69) is such that a partial product based on, for example, $y_3\, y_2\, y_1$ is produced and this is added in full adder 67 to a partial product based on $y_1\, y_0\, y_{-1}$ maintained in the register 69. The addition result is stored in the register 68. At the time when 3-bit group changes from $y_3\, y_2\, y_1$ to $y_5\, y_4\, y_3$, the data in the register 68 are transferred to the register 69. Accordingly, in such a flow of data, in order to equalize the clock for driving the registers 68 and 69 with the clock for driving the multiplier shift register 64, it is necessary to shift the even number bits and the odd number bits at the same time. By this modification, a complex clock generator circuit can be prevented and the number of hardware elements can be reduced.

Figure 13:
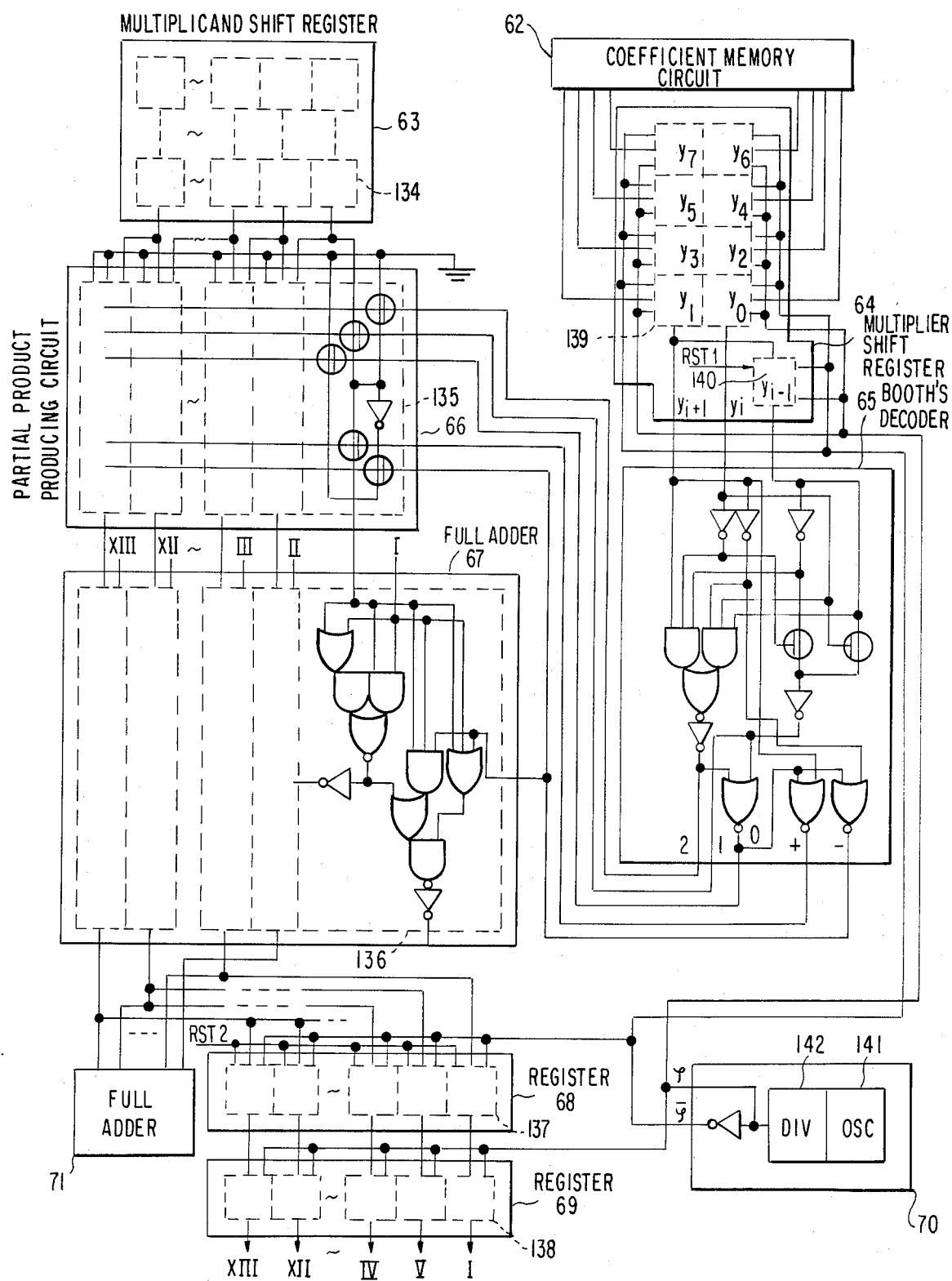
FIG. 13 is a block diagram showing details of one example of the multiplier circuit of the present invention shown in FIG. 11.

In FIG. 13 is shown one example of a detailed construction of the mutliplier shift register 64, Booth's decoder 65, partial product producing circuit 66, full adder 67, register 68, register 69 and clock generator 70. Although a product of a 12-digit number × 8 digit number becomes a 20-digit number, the circuit in FIG. 13 is constructed such that a maximum of 12 significant digits can be read out. In this figure, amplitude information or a coefficients read out of a coefficient memory circuit 62 are input to a multiplier shift register 64 divided into a odd number group ($y_1$, $y_3$, $y_5$, $y_7$) and an even number group ($y_0$, $y_2$, $y_4$, $y_6$). In this multiplier shift register 64, four 1-bit shift registers 139 are arrayed in series on each of the odd number side and the even number side. In response to a clock issued from a clock generator 70, the data in this shift register 64 is shifted. The output from the shift register 64 is provided as an input to a Booth's decoder 65 3 bits at a time. One of the bit inputs to the Booth's decoder 65 is a previous odd number bit datum delayed by one bit cycle by a delaying shift register 140. Before the bits $Y_0$ and $Y_1$ are supplied to the Booth's decoder 65, the delaying shift register 140 is reset by a reset signal $RST_1$.

In the block of the Booth's decoder 65 in FIG. 13 is shown one example of a detailed circuit, in which the logic follows the logic value table in Table 1, and which applies signals representing a coefficient (2, 1, 0) and a sign (+, −) to a partial product producing circuit 66. Representing an output from a multiplicand shift register 63 by X, the partial product producing circuit 66 carries out an operation for producing a partial product of ±2X, ±X or 0. Reference numeral 135 denotes one example of a detailed circuit for a one-bit portion of the partial product producing circuit 66. Upon product the partial product 2X, X is shifted by one bit to the more significant positions and 0 is provided as an input to the least significant position. Upon producing the partial product −X, X is inverted to X̄, and "1" is added to the least significant bit in a full adder 67 because the operation is based on two's complement. Reference numeral 41 designates a latch for holding the "1" to be added to the least significant bit, and it latches the data in response to a clock issued from a clock generator 70. Upon producing the partial product 0, 0 is provided as an output in response to the coefficient 1. UPon −2X, the 2X operation and the −X operation are effected in combination. In other words, after X has been shifted by one bit toward the more significant positions, every bit is inverted and 1 is added to the least significant bit in the full adder 67. Although the data length in the multiplicand shift register 63 is 12 bits, since, for the the 2X operation requires that data be shifted by one bit toward the more significant positions, the partial product producing circuit 66 has a 13-bit construction. This is effective for preventing the significant digits from being reduced by one digit.

Likewise, the full adder 67 also has a 13-bit construction. Reference numeral 136 designates one example of a detailed circuit for one bit in the full adder 67. The output of the register 69 is applied to the input portions I, II, III, . . . XII and XIII of the full adder 67. The output of the full adder 67 is latched in a register 68 as shifted by 2 bits to the less significant positions. This is an operation for aligning digits to process the multiplier 2 bits at a time. The most significant bit in the full adder 67 is provided as an input to the most significant position and the next less significant position of the register 68. The registers 68 and 69 are driven by clocks $\phi$ and $\bar{\phi}$ (these having different phases) issued from the clock generator 70. Reference numerals 137 and 138 designate blocks for one bit of the registers 68 and 69, respectively, and they may be, for example, flip-flops. The register 68 is reset by a reset signal $RST_2$ at an appropriate timing. Since the output to be transferred from the full adder 67 to a full adder 71 in the next state has 12 digits, only the most significant 12 digits of the output from the full adder 67 are output to the full adder 71. By way of example, the clock generator 70 is constructed by a crystal oscillator 141, a frequency-divider 142 for dividing the frequency of the oscillator output to produce a clock, and an inverter for producing an inverted clock. In the multiplier circuit having a circuit construction as shown in FIG. 13, because the multiplier shift register 64 is formed in parallel arrays, only one kind of drive clock frequency is necessary. If the multiplier shift register 64 is a serial shift register in which data is shifted serially bit by bit in the manner of $y_0 \leftarrow y_1 \leftarrow \ldots \leftarrow y_7$, the clock for driving the multiplier shift register 64 must have a clock frequency ($2\phi$) which is twice as high as the frequency of the output ($\phi$) from the clock generator 70. Accordingly, in view of the formation of the multiplier circuit in an LSI device, the use of the shift register of parallel arrays as the multiplier shift register 64 has the advantages that wiring and design of the clock generator becomes simple and also the number of hardware elements is reduced.

Now the operation of the multiplier circuit in FIG. 13 will be explained with reference to a timing chart in FIG. 14. Waveforms $\phi$ and $\bar{\phi}$ represent the output clocks issued from the clock generator 70. The multiplier data are shifted in the shift register 64 in response to the output clocks $\phi$ and $\bar{\phi}$ from the clock generator 70 in the manner of $y_1\, y_0\, y_{-1} \rightarrow y_3\, y_2\, y_1 \rightarrow y_5\, y_4\, y_3 \rightarrow y_7\, y_6\, y_5$. According to the variation of the output of the multiplier shift register 64, the output of the Booth's decoder 65 is also varied. The data in the multiplicand shift register 63 are shifted at the same timing as the reading out of the coefficient memory circuit 62. Representing the partial products produced on the basis of $y_1\, y_0\, y_{-1}$, $y_3\, y_2\, y_1$, $y_5\, y_4\, y_3$ and $y_7\, y_6\, y_5$ by $P_1, P_2, P_3$ and $P_4$, respectively, these partial products are successively produced by the partial product producing circuit 66 in synchronism with the output clock $\phi$ from the clock generator 70. The full adder 67 adds these partial products at the same timing in the manner of $P_1 \rightarrow P_1 + P_2 \rightarrow P_1 + P_2 + P_3 \rightarrow P_1 + P_2 + P_3 + P_4$ to calculate partial sums and eventually to provide a total sum. The register 68 for holding the output of the full adder 67 changes its contents in response to the output clock $\phi$ from the clock generator 70. After the register 68 has transferred the final partial sum $P_1 + P_2 + P_3$ to the register 69, it is reset by the reset signal $RST_2$. The output of the register 68 is stored in the register 69 as synchronized with the output clock $\phi$ from the clock generator 70. In this way, the register 69 holds the partial sum until a new partial product is produced in the partial product producing circuit 66, and outputs this partial sum to the full adder 67 in response to the output clock $\phi$. Here it is to be noted that, as will be apparent from FIGS. 13 and 14, the decode process, the partial product producing process and the adding process are all executed in the same period, and for the processing period last for only one clock cycle.

As described above, in the digital processing circuit according to the present invention, the number of hardware elements to be used for the Booth's decoder, partial product producing circuit and full adder can be largely reduced. Owing to the fact that a multiplier is set in a shift register rather than in a simple register, it becomes possible to employ parallel arrays of data, and hence a clock generator circuit for controlling the multiplier circuit can also be simplified. In addition, while the description above has been given with respect to a second order Booth's algorithm, the operation can be controlled by means of a single clock generator for an n-th order Booth's algorithm by providing n multiplier shift registers arranged in parallel. As to the number of significant digits, a necessary number of digits could be determined in each case.

What is claimed is:

1. A digital processing circuit for multiplying a multiplicand and a multiplier to produce a multiplication result, comprising:

first means for storing said multiplicand therein;
second means for storing said multiplier therein;
third means coupled to said second means for decoding the multiplier read out of said second means according to Booth's algorithm to thereby produce coefficients;
fourth means coupled to said third means and said first means for producing partial products by multiplying the multiplicand by said coefficients;
fifth means for receiving first and second inputs and for executing addition of said first and second inputs, said first input comprising said partial products;
sixth means for receiving an addition result from said fifth means and feeding back this result as said second input of said fifth means; and
seventh means for outputting said addition result as a multiplication result.

2. A digital processing circuit as claimed in claim 1, wherein said multiplier has a plurality of bits, and each coefficient produced by said third means corresponds to a predetermined number of said bits less than said plurality of bits.

3. A digital processing circuit as claimed in claim 2, wherein each of said coefficients produced by said third means is −2, −1, 0, +1 or +2 in accordance with its corresponding predetermined number of bits.

4. A digital processing circuit as claimed in claim 1 or 2, wherein said second means comprises a shift-register.

5. A digital processing circuit as claimed in claim 4, wherein said shift-register serially stores said plurality of bits of said multiplier and serially shifts said plurality of bits to said third means.

6. A digital processing circuit as claimed in claim 5, further comprising a clock generator generating a first clock having a first frequency for driving at least said sixth means and a second clock having a second frequency higher than said first frequency for driving said second means.

7. A digital processing circuit as claimed in claim 4, wherein said shift register stores said plurality of bits in parallel and shifts said bits in parallel to said third means.

8. A digital processing circuit as claimed in claim 4, further comprising a clock generator generating a clock for driving said second means and said sixth means.

9. A digital processing circuit as claimed in claim 1, wherein said seventh means is coupled to said fifth means.

10. A digital processing circuit as claimed in claim 1, wherein said seventh means is coupled to said sixth means.

11. A digital processing circuit for multiplying a multiplicand by a plural bit multiplier to produce a multiplication result, comprising:
a first memory for storing said multiplicand;
a second memory for storing said multiplier;
a decoder for decoding the multiplier in said second memory according to Booth's algorithm to produce coefficients with each coefficient corresponding to a predetermined number of multiplier bits less then the entire number of bits in said multiplier;
a partial product producing circuit for producing partial products by multiplying the multiplicand in said first memory by the coefficients produced by said decoder;
an adder circuit for adding together the partial products produced by said partial product producing circuit to produce a multiplication result; and
means for transferring n consecutive multiplier bits in parallel from said second memory to said decoder, where n is equal to said predetermined number.

12. A digital processing circuit as claimed in claim 11, wherein said second memory comprises two shift-register portions arranged in parallel.

13. A digital processing circuit as claimed in claim 12, wherein said second memory further comprises delaying means for delaying an output from one of said two shift-register portions.

14. A digital processing circuit as claimed in claim 13, wherein said decoder produces said coefficients depending on a combination of outputs from said two shift-register portions and said delaying means.

15. A digital processing circuit as claimed in claim 14, wherein said coefficients are any one of −2, −1, 0, +1 or +2.

16. A digital processing circuit as claimed in claim 11, 12 or 13, wherein said adder circuit adds the partial product corresponding to each combination of consecutive bits of said multiplier to a sum of previously obtained partial products.

17. A digital processing circuit as claimed in claim 11, 12 or 13, wherein said adder circuit comprises an adder having a first input receiving said partial product from said partial product producing circuit and a second input, a shift-register receiving an output from said adder, and a register receiving an output from said shift-register and applying its output to said second input of said adder.

18. A digital processing circuit as claimed in claim 11, wherein said first memory comprises a register having first, second and third inputs and an output and selectively storing any one of said three inputs as said multiplicand in response to a control signal, means for providing initial data as said first input, means for feeding back the output of said register as said second input and means for providing a further partial product sum as said third input, said adder circuit comprising a first adder for adding a plurality of consecutive partial products during a first period of time to produce a first partial product sum and for adding a plurality of consecutive partial products during a second period of time to produce a second partial product sum, and a second adder for adding together the first and second partial product sums to generate a said further partial product sum, and means for generating said control signal to select said first input for the first partial product in said first period of time, said third input for the first partial product in said second period of time and said second input during each of said first and second periods of time after the first partial products.

* * * * *

UNITED STATES PATENT AND TRADEMARK OFFICE
CERTIFICATE OF CORRECTION

PATENT NO. : 4,546,446

DATED : October 8, 1985

INVENTOR(S) : Toshiaki MACHIDA, Tokyo Japan

It is certified that error appears in the above-identified patent and that said Letters Patent is hereby corrected as shown below:

Column 1, line 13, "manne Recently" should read --manner. Recently--.

Column 3, line 3, "by carry" should read --by carrying--;

line 60, before "multiplier" insert --a--.

Column 4, line 65, "$(2y_{2i} + 2 + y^2_{i+1} -$" should read $---2y_{2i} + 2 + y_{2i+1} -$ --;

Column 5, line 48, after "6a" insert --also formed of a plurality of one-bit full adders.--.

Column 6, line 28, "last" should read --least--;

line 29, "et" should read --at--;

line 32, "Irocessing" should read --processing--;

line 44, "insetted" should read --inserted--;

line 60, "anothe" should read --another--.

Column 7, line 5, "psrtial" should read --partial--;

line 41, "processin" should read --processing--.

Column 8, line 65, "decoder 3" should read --decoder 13--.

UNITED STATES PATENT AND TRADEMARK OFFICE
CERTIFICATE OF CORRECTION

PATENT NO. : 4,546,446

DATED : October 8, 1985

INVENTOR(S) : Toshiaki MACHIDA, Tokyo Japan

It is certified that error appears in the above-identified patent and that said Letters Patent is hereby corrected as shown below:

Column 9, line 16, "fromdhe" should read --from the--;

line 55, "after "FIG. 9," insert --reference numeral 31 designates an impulse signal generator circuit, and--;

line 63, "state" should read --stage--.

Column 10, line 1, "format" should read --formant--;

line 1, "state" should read --stage--;

line 9, "delete "single term".

Column 11, line 61, "$W_r$" should read --$W_4$--.

Column 12, line 23, "$Y_0 \ y - 1$" should read --$Y_0 Y_{-1}$--;

line 67, "upon product" should read --Upon producing--.

Column 13, line 3, "inverted to X," should read --inverted to $\overline{X}$,-- line 10, delete "coefficient 1." and insert --coefficient 0, and upon producing the partial product X, X is in itself output in response to the coefficient 1.--;

line 10, delete "UPon" and insert --Upon producing--;

line 16, delete "the" (second occurrence);

UNITED STATES PATENT AND TRADEMARK OFFICE
CERTIFICATE OF CORRECTION

PATENT NO. : 4,546,446 (Page 3 of 3)

DATED : October 8, 1985

INVENTOR(S) : Toshiaki MACHIDA, Tokyo Japan

It is certified that error appears in the above-identified patent and that said Letters Patent is hereby corrected as shown below:

line 40, "state" should read --stage--;

line 64, "$\phi$ and $\phi$ represent" should read --$\phi$ and $\bar{\phi}$ represent--;

line 66, before "shift" insert --multiplier--.

Column 14, line 10, delete "$\bar{\phi}$" and insert --$\phi$--.

Signed and Sealed this

Ninth Day of September 1986

[SEAL]

Attest:

DONALD J. QUIGG

Attesting Officer

Commissioner of Patents and Trademarks